United States Patent
Brillhart et al.

(10) Patent No.: US 10,161,829 B2
(45) Date of Patent: Dec. 25, 2018

(54) SYSTEM AND METHOD FOR CERTIFICATION OF PHYSICAL PARAMETERS OF COMMUNICATION LINKS

(71) Applicant: Fluke Corporation, Everett, WA (US)

(72) Inventors: Theodore J. Brillhart, Seattle, WA (US); J. David Schell, Austin, TX (US)

(73) Assignee: Fluke Corporation, Everett, WA (US)

( * ) Notice: Subject to any disclaimer, the term of this patent is extended or adjusted under 35 U.S.C. 154(b) by 426 days.

(21) Appl. No.: 14/731,004

(22) Filed: Jun. 4, 2015

(65) Prior Publication Data

US 2016/0356670 A1 Dec. 8, 2016

(51) Int. Cl.
*G01M 11/00* (2006.01)
*H04B 10/079* (2013.01)
(Continued)

(52) U.S. Cl.
CPC .... *G01M 11/3136* (2013.01); *G01M 11/3145* (2013.01); *G01M 11/33* (2013.01);
(Continued)

(58) Field of Classification Search
CPC .. H04B 10/07; H04B 10/0705; H04B 10/071; H04B 10/073; H04B 10/0731; H04B 10/075; H04B 10/077; H04B 10/0771; H04B 10/0773; H04B 10/0775; H04B 10/0777; H04B 10/0779; H04B 10/079;
(Continued)

(56) References Cited

U.S. PATENT DOCUMENTS 5,754,285 A 5/1998 Eslambolchi et al.
2006/0244949 A1* 11/2006 Chen .................. G01M 11/3163
356/73.1

(Continued)

OTHER PUBLICATIONS

VeEXinc: "Fiberizer Mobile | OPX BOX OTDR & Android Tablet", youtube, Oct. 8, 2014, https://www.youtube.com/watch?v=5bDBiCCzSXk [retrieved on Oct. 10, 2016].
(Continued)

*Primary Examiner* — Gordon J Stock, Jr.
(74) *Attorney, Agent, or Firm* — Seed Intellectual Property Law Group LLP

(57) ABSTRACT

A system for certifying physical parameters of fiber optic cabling may include a test device coupled to an end of a fiber optic cable. The test device injects light into the fiber optic cable and conducts a certification test of physical parameters of the fiber optic cable. Based on observation of interaction of the injected light with the fiber optic cable, the test device tests one or more physical parameters of the cable and certifies whether the tested parameters satisfy corresponding parameters specified by a predetermined standard. A separate device may communicate a control signal (e.g., wirelessly) to the test device for controlling an operation of the certification test. The separate device is further operable to receive a result of the certification test from the test device. The separate device may further communicate with a remote computing device updates a database element with information regarding the certification test.

22 Claims, 8 Drawing Sheets

(51) Int. Cl.
  *H04B 10/073* (2013.01)
  *H04B 10/071* (2013.01)
(52) U.S. Cl.
  CPC ....... *H04B 10/071* (2013.01); *H04B 10/0731* (2013.01); *H04B 10/07955* (2013.01)
(58) Field of Classification Search
  CPC ............ H04B 10/0791; H04B 10/0793; H04B 10/0795; H04B 10/07951; H04B 10/07953; H04B 10/07955; H04B 10/07957; H04B 10/0797; H04B 10/0799; G01M 11/30; G01M 11/31; G01M 11/3109; G01M 11/3118; G01M 11/3127; G01M 11/3136; G01M 11/3145; G01M 11/3154; G01M 11/3163; G01M 11/33; G01M 11/331; G01M 11/332; G01M 11/333; G01M 11/334; G01M 11/335; G01M 11/336; G01M 11/337; G01M 11/338; G01M 11/39
  USPC ......................................................... 356/73.1
  See application file for complete search history.

(56) References Cited

U.S. PATENT DOCUMENTS

| | | |
|---|---|---|
| 2007/0103670 A1 | 5/2007 | Sezerman et al. |
| 2012/0086935 A1 | 4/2012 | Smith et al. |
| 2013/0212434 A1* | 8/2013 | Janky ...................... H04L 43/50 714/27 |
| 2014/0092381 A1* | 4/2014 | Chu ................... G01M 11/3145 356/73.1 |
| 2014/0136139 A1* | 5/2014 | LaBonge ............... H04B 10/07 702/122 |
| 2015/0062562 A1* | 3/2015 | Kassler ............. G01M 11/3136 356/73.1 |
| 2015/0086194 A1* | 3/2015 | Kassler ............. H04B 10/0773 398/28 |
| 2016/0041065 A1* | 2/2016 | L'Heureux ........ G01M 11/3154 356/73.1 |

OTHER PUBLICATIONS

EP Search Report for Application No. 16172810.0, dated Oct. 17, 2016, 11 pgs.
Fluke Networks, "Field Testing Installed Optical Fiber Cabling" Jun. 2010, 18 pgs.
Fluke Networks, "Optical Fiber Test and Troubleshooting Solutions" 2012, 8 pgs.
Fluke Networks, "Datasheet: OptiFiber® Pro OTDR" Sep. 30, 2014, 10 pgs.

* cited by examiner

SYSTEM AND METHOD FOR CERTIFICATION OF PHYSICAL PARAMETERS OF COMMUNICATION LINKS

BACKGROUND

Technical Field

The present disclosure generally pertains to testing and certifying physical parameters of communication links, as well as systems configured for certifying the physical parameters of cabling and equipment providing communication links.

Description of the Related Art

Communication channels in various types of networks employ a variety of physical media for transmission of signals, including metal wiring, fiber optic cables, and wireless links. While communication protocols and architectures are significant, equally important is the physical layer, e.g., Layer 1 of the 7-Layer OSI model, of networks and the cabling that support it.

Fiber optic cables, for example, provide a low loss medium for transmission of data at high speeds. Ongoing expansion of data traffic over computer network communication links is often accompanied by higher expectations of reliability. It is therefore important that installations providing communication links, including optical fiber cabling, be tested and certified to assure that the links were properly installed and that the communication channels provided by the links will achieve expected physical reliability and performance measures.

In regard to fiber optic cabling, high performance local area networks (LANs) such as Gigabit Ethernet and 10 Gigabit Ethernet permit less loss in optical fiber cabling than older networks, and even higher performance networks, such as 40/100 Gigabit Ethernet, continue to drive higher performance requirements. In newer applications, devices drive signals over optical fiber using lasers (e.g., vertical cavity surface emitting lasers, for example) that inject light in a much smaller area of the fiber compared with older light emitting diode (LED) drivers. Accordingly, certification of the physical integrity of fiber optic links, including connectors and splices, is increasingly important.

BRIEF SUMMARY

In various embodiments, described herein are systems and methods for certifying physical parameters of communication links, including for example, fiber optic cabling. In at least one embodiment, the system comprises a test device operably couplable to the end of a fiber optic cable. The test device is operable to inject light into the fiber optic cable and conduct a certification test of physical parameters of the fiber optic cable. Based on observation of interaction of the injected light with the fiber optic cable, the test device is further operable to evaluate one or more physical parameters of the fiber optic cable and certify whether the one or more physical parameters satisfy one or more corresponding parameters specified by a predetermined standard. In addition, a wireless device is operably couplable to the test device. The wireless device is configured to wirelessly communicate a control signal to the test device for controlling an operation of the certification test. The wireless device is further operable to wirelessly receive a result of the certification test from the test device.

The system may include two test devices, namely a first test device and a second test device. The first test device is operably couplable to a first end of the fiber optic cable, and the second test device is operably couplable to a second end of the fiber optic cable. The wireless device is further operable to wirelessly receive a result of the certification test from the second test device. In some instances, the second test device may include an optical power meter operable to receive output light from the second end of the fiber optic cable, and based on the received output light, generate a result of the certification test indicative of an insertion power loss of the fiber optic cable. The control signal communicated by the wireless device may, for example, initiate communication of an input light signal and reception of an output light signal by the first and send test devices, respectively.

In various embodiments, the test device may include optical time domain reflectometer (OTDR) circuitry operable to receive reflected light from the fiber optic cable indicative of interaction of the injected light with one or more physical aspects of the fiber optic cable. The OTDR circuitry is further operable to evaluate the reflected light and produce a result of the certification test based on the evaluation.

For example, as a physical parameter of a fiber optic cable, a connector may be used to connect at least one segment of the fiber optic cable with an adjacent optical fiber. The OTDR circuitry is operable to produce data indicating an optical power loss as a result of the connector and an approximate location of the connector within the fiber optic cable.

Alternatively, or in addition, another physical parameter of the fiber optic cable may be a splice in the fiber optic cable. The OTDR circuitry is operable to produce data indicating an optical power loss as a result of the splice and an approximate location of the splice within the fiber optic cable.

Alternatively, or in addition, another physical parameter of the fiber optic cable is a length of the fiber optic cable. The OTDR circuitry is operable to produce data indicating an approximate length of the fiber optic cable.

Alternatively, or in addition, another physical parameter of the fiber optic cable may be a fault within the fiber optic cable. The OTDR circuitry is operable to produce data indicating an optical power loss as a result of the fault and an approximate location of the fault within the fiber optic cable.

In various embodiments, the wireless device may be further communicatively coupled to a remote computing device that is operable to receive a result of a certification test from the wireless device. The remote computing device may update a database element with information indicating whether the one or more physical parameters of the fiber optic cable satisfy the one or more corresponding parameters of the predetermined standard.

A result of a certification test may include data representing the one or more physical parameters of the fiber optic cable. In an embodiment, the wireless device may evaluate the one or more physical parameters of the fiber optic cable and certify whether the one or more physical parameters satisfy one or more corresponding parameters specified by a predetermined standard. In another embodiment, the wireless device may be further operable to receive an input indicative of the one or more corresponding parameters specified by the predetermined standard and compare the received data with the corresponding parameters to certify whether the fiber optic cable satisfies the predetermined standard. Alternatively, or in addition, the wireless device may be operable to receive an input indicative of corresponding parameters specified by multiple standards and compare the received data with the corresponding parameters to determine which of the multiple standards is satisfied by the fiber optic cable and to certify the fiber optic cable for the standard or standards that are satisfied.

In yet other embodiments, a system for certifying physical parameters of fiber optic cabling may include a test device, a handheld computing device, and a remote computing device. The test device is operably couplable to an end of a fiber optic cable to inject light into the fiber optic cable.

The handheld computing device is operable to communicate with the test device as part of a certification test of the fiber optic cable and receive, from the test device, data based on observation of interaction of the injected light with the fiber optic cable. The remote computing device is operable to communicate with the handheld computing device and coordinate, with the handheld computing device, processing of the data received by the handheld computing device and certification of whether one or more physical parameters of the fiber optic cable satisfy one or more corresponding parameters specified by a predetermined standard.

In some embodiments, the handheld computing device may be a mobile telephone comprising communication circuitry configured to wirelessly communicate with the test device and the remote computing device. The mobile telephone may be operable to process the data received from the test device and certify whether the one or more physical parameters of the fiber optic cable satisfy the one or more corresponding parameters specified by the predetermined standard. The remote computing device may communicate data indicative of the one or more corresponding parameters of the predetermined standard to the mobile telephone.

In still other embodiments, a method for certifying physical parameters of fiber optic cabling includes coupling a light source to an end of a fiber optic cable and communicating light into the fiber optic cable; receiving light from the fiber optic cable based on the light injected into the fiber optic cable, and generating data, based on the received light, that is indicative of interaction of the injected light with one or more physical aspects of the fiber optic cable; processing the generated data in a computing device to evaluate one or more physical parameters of the fiber optic cable and automatically determine whether the one or more physical parameters satisfy one or more corresponding parameters specified by a predetermined standard; and based on the determination, automatically communicating a certification to an output, wherein the certification indicates whether the fiber optic cable satisfies the predetermined standard.

DETAILED DESCRIPTION

Figure 1:
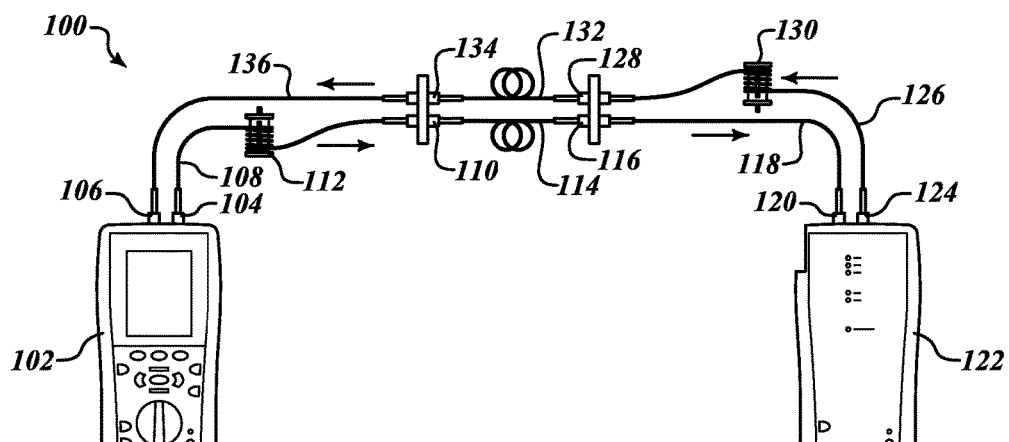
FIG. 1 illustrates an embodiment of a system usable for certifying physical parameters of fiber optic cabling.

Certification and documentation of new, added, moved, or changed communication links, including optical fiber installations, are frequently required to ensure that the links in the installations are performing to specifications. For example, a contractor may be required to prove that an optical fiber installation satisfies one or more predetermined industry standards as a condition for completion of the project or for payment. A network owner may seek to certify the integrity of an optical fiber installation to qualify for warranty coverage and/or ensure that the installed fiber will provide a promised performance. Various organizations have promulgated industry standards that set forth objective requirements for communication links. When communication links are tested and the objective requirements of an industry standard are met, the communication links are certified as meeting the industry standard. For example, when installed fiber cabling meets industry standards, certification of the fiber cabling helps assure that the communication links provided by the installed fiber cabling will achieve a specified performance.

In contrast, simple verification of cabling is useful to check the ability of a cable to communicate a signal. Such verification tools, however, are not able to identify specific physical problems with a cable. More-advanced certification tools are needed.

Depending on the industry standard at issue, a network technician seeking to certify a fiber optic cable as meeting that standard may start with a light source and power meter (LSPM) set, a visual fault locator (VFL), and/or an Optical Loss Test Set (OLTS) main-remote pair. As discussed in greater detail herein, a technician may also measure the loss of each span, connector, and splice of a fiber optic cable using an Optical Time Domain Reflectometer (OTDR). An OTDR is further useful to check fiber optic cables for bends and other defects in the physical media and to estimate the length of the fiber optic cable.

The Telecommunications Industry Association (TIA) and the Technical Standard Board (TSB) are among many organizations that publish standards for network communications links. Other organizations that publish standards include the International Organization for Standardization (ISO), the Institute of Electrical and Electronic Engineers (IEEE), and the International Electrotechnical Commission (IEC). In further circumstances, specifications required by a contract, such as a government contract, may set forth objective requirements that must be tested and met. In such circumstances, the contract specifications may be considered a "standard" for which a cabling installation may be certified as meeting, in accordance with the present disclosure.

For example, the TIA/TSB 140 standard requires testing of each fiber link with an OLTS for attenuation (or insertion loss) of optical signals transmitted over the fiber link. This standard considers use of an OTDR optional. As will be appreciated from the following description, an OLTS test device typically produces more accurate readings of signal loss over a fiber optic cable. However, an OLTS test device typically cannot characterize or provide information on specific physical aspects of the fiber, such as to indicate the quality of specific aspects of fiber spans, connections, and splices, of a fiber link. An OTDR is useful to indicate and localize problems, such as a specific connector with unacceptable loss, that may be missed by an OLTS test device. OTDR testing typically does not replace OLTS testing. OTDR testing usually offers additional information that can help a technician detect and proactively fix problems that may be observed by OLTS testing.

Similar to the TIA/TSB 140 standard, the TIA-468B standard requires measurement of insertion loss to certify a fiber optic cable. Insertion loss is sometimes referred to as "dB loss," "attenuation," or simply "loss." TIA standards specify that a technician must measure loss using an optical power meter and a proper light source to certify an optical fiber cable. Multimode fiber loss measurements are generally made using an LED light source, while single-mode fiber loss measurements are generally made using a laser source. ISO/IEC 11801 is another example of an international standard, in this case for general-purpose telecommunication cabling systems suitable for a wide range of applications.

TIA-568-C.0 specifies field testing of an installed optical fiber link for end-to-end attenuation of the link. The standard provides recommended "acceptable" loss values based on the link length and number of connections.

TIA standards specify maximum lengths for horizontal and backbone optical fiber cables, which are tested as part of a certification process. In some circumstances, the length of a fiber optic cable can be optically measured, e.g., using an OTDR. Alternatively or additionally, it may be appropriate to simply physically measure the length of the fiber optic cable, e.g., by referring to length markings on the cable itself.

For commercial building installations, TIA-568-C.1 specifies maximum lengths for three types of fiber optic links, namely horizontal links, backbone links, and centralized links. Fiber optic cabling in horizontal links may be up to 90 m in length, measured for example from a Telecommunications Room (TR), Equipment Room (ER), or Telecommunications Enclosure (TE) to a work area, which may include an optional Consolidation Point (CP). Backbone links, e.g., cabling between two telecommunications spaces such as TRs, TEs, ERs, and entrance facilities (EF), have distance limitations determined by the network application in use, according to supportable distances listed in TIA-568-C.0 Annex D. Centralized links have a special exemption from the 90 m horizontal link limit. For example, a backbone link and a horizontal link may be interconnected or spliced to extend the distance between electronics in the ER and the work area beyond 90 m according to the supportable distances listed by application in TIA-568-C.0 Annex D. Continuous pull-through fiber links are still limited to 90 m.

TIA-568-C.0 specifies the wavelengths for fiber optic testing as follows:

| Link type | Wavelengths - multimode (MM) | Wavelengths - single-mode (SM) |
| --- | --- | --- |
| Horizontal | 850 nm or 1300 nm | 1310 nm or 1550 nm |
| Backbone | 850 nm and 1300 nm | 1310 nm and 1550 nm |
| Centralized-pull through | 850 nm or 1300 nm | 1310 nm or 1550 nm |
| Centralized-interconnect/splice | 850 nm and 1300 nm | 850 nm and 1300 nm |

Insertion loss is usually calculated as a combination of cable insertion loss, connector insertion loss, and splice insertion loss. As specified by TIA-568-C.3, maximum component loss values are 0.75 dB maximum loss for each mated pair of connectors, 0.3 dB maximum loss for each splice, 3.5 dB/km loss for multimode fiber at 850 nm, 1.5 dB/km loss for multimode fiber at 1300 nm, 1.0 dB/km loss for single-mode fiber in indoor cable (both wavelengths), and 0.5 dB/km loss for single-mode fiber in outdoor cable (both wavelengths). TIA-568-C.0 requires testing each link in only a single direction.

TIA-568-C.0 provides additional recommendations for field testing. Two tiers of certification testing are specified. Tier 1 testing is required to be compliant with the standard and includes attenuation testing, which as noted above is typically tested using a light source and power meter (LSPM) or an optical loss test set (OLTS). Tier 1 testing further includes an assessment of link length, which may be determined by test equipment or manually from cable jacket markings, and testing of polarity to ensure that a transmitter and receiver on opposite ends of the fiber will connect.

Under TIA-568-C.0, Tier 2 testing is optional and includes all of Tier 1 testing, as well as Optical Time Domain Reflectometer (OTDR) testing. An OTDR injects multiple pulses of light into a fiber optic cable and measures reflections from back-scattering of the light pulses caused by imperfections in the fiber and/or interruptions in the fiber from components such as connectors and splices. The timing of the reflections received by the OTDR is usable to calculate the distance to such "events." An OTDR may also automatically estimate the loss slope or "attenuation" of fiber segments and the insertion loss of individual connectors and splices. When the tested parameters of a fiber optic cabling are evaluated and determined to satisfy corresponding parameters of a predetermined industry standard, the fiber cabling may be certified as meeting the standard. Additionally, the results of the certification testing may be communicated to an output, including one or more further wired or wireless devices as described herein.

OTDR testing is typically most valuable when a technician is seeking to locate a problem with the fiber optic link. For example, OTDR testing is ideal for locating the cause of high loss in a fiber optic link. If a cable under test containing several splices shows high loss, and cleaning of the connectors does not correct the problem, an OTDR may reveal which of the splices or which fiber span or connector is causing the high loss measurement.

Another physical parameter that may be measured is the channel capacity of the fiber optic link. For optical fiber, the channel capacity may be measured in terms of bandwidth or dispersion, which includes modal, chromatic, and polarization. Channel capacity may also be measured as differential mode delay for multimode fiber.

TIA-526-14A specifies testing practices and parameters for multimode fiber and TIA-526-7 specifies testing practices for single-mode fiber. Loss may be measured by injecting a known amount of light into one end of a fiber and measuring the amount of light exiting the other end.

For example, FIG. 1 illustrates an embodiment of a system 100 usable for certifying physical parameters of fiber optic cabling. In this illustrated embodiment, the system 100 includes a first test device 102 and a second test device 122. The first test device 102 includes ports 104 and 106 that operably couple the test device to fiber optic cables 108 and 136, respectively. The first test device 102 further includes circuitry and programmed logic that are operable to inject an input light signal from a light source into an end of the fiber optic cable 108 via the port 104. A second end of the fiber optic cable 108 is coupled to a connector 110. The fiber optic cable 108, in this embodiment, is a launch reference cable or launch cord that couples the test device 102 to the fiber optic cable under test 114 via the connector 110.

In this particular embodiment, the fiber optic cable 108 is comprised of multimode fiber. When injecting light into a multimode fiber, TIA standards specify use of a mandrel 112 during calibration and testing to achieve greater accuracy in loss measurements. The mandrel 112 is a smooth rod around which the multimode fiber optic cable 108 is wrapped several non-overlapping times. Preferably, for consistency, the cable and mandrel assembly is secured to reduce undesirable movement of the assembly. The diameter of the mandrel may be determined by the size and construction of the fiber optic cable 108. In multimode testing, the mandrel 112 removes the modes or pathways of light near the outer edge of the fiber optic core. Failure to use a mandrel in this case may incorrectly increase the loss measurement and possibly result in a false failure. If a high loss is unexpectedly encountered in a fiber cabling, a mandrel may be used as part of a process of resolving the high loss.

The fiber optic cable under test 114 spans between the connector 110 and a connector 116. A further fiber optic cable 118 acting as a receive reference cable or tail cord couples the connector 116 to a port 120 of the second test device 122. The second test device 122 includes circuitry and programmed logic that are operable to receive, at an optical power meter, an output light signal from an end of the fiber optic cable 118 through the port 120. Accordingly, an input light signal injected by the first test device 102 into the fiber optic cable 108 is transmitted through the fiber optic cable under test 114 and received by the second test device 122 via the fiber optic cable 118.

FIG. 1 further illustrates a test of a fiber optic cable 132 in a direction opposite that of the test described above. The second test device 122 includes a port 124 that operably couples the test device to a fiber optic cable or launch cord 126. The circuitry and programmed logic in the second test device 122 enables the second test device to inject an input light signal into an end of the fiber optic cable 126. The fiber optic cable 126 is coupled to the fiber optic cable under test 132 via a connector 128. As with the multimode fiber optic cable 108, the fiber optic cable 126 is comprised of multimode fiber so, in accordance with TIA standards, a mandrel 130 is provided, around which the fiber optic cable 126 is wrapped.

The fiber optic cable under test 132 spans between the connector 128 and a connector 134. A further fiber optic cable 136 is coupled to the connector 134, and operates as a receive reference cable or tail cord that couples the connector 134 to the port 106 of the first test device 102. As with the second test device 122, the first test device 102 includes circuitry and programmed logic (e.g., including an optical power meter) that enable the first test device 102 to receive an output light signal from the fiber optic cable 136. Accordingly, an input light signal injected by the second test device 122 into the fiber optic cable 126 is transmitted through the fiber optic cable under test 132 and received by the first test device 102 via the fiber optic cable 136.

Based on the output light signals received by the first and second test devices (via the ports 106 and 120, respectively), the first and second test devices 102, 122 are able to evaluate the physical integrity of the fiber optic cables under test 114, 132. In this regard, the first and second test devices 102, 122 may measure the end-to-end insertion loss of each of the cables under test and compare the insertion loss to a maximum insertion loss deemed to be acceptable by a predetermined standard. In that regard, either prior to, during, or after the process of testing the fiber optic cables 114, 132, the first test device 102 and/or the second test device 122 accesses information indicating the established parameters of a predetermined standard, or a plurality of predetermined standards, e.g., by a call to a database (remote or local to the test device) where the information is stored. If the measured insertion loss parameter does not satisfy the acceptable insertion loss parameter of the standard (i.e., the measured insertion loss exceeds the specified maximum insertion loss), the first and/or second test devices 102, 122 produce a test result in which the respective fiber optic cable under test is not certified as satisfying the predetermined standard.

Figure 2:
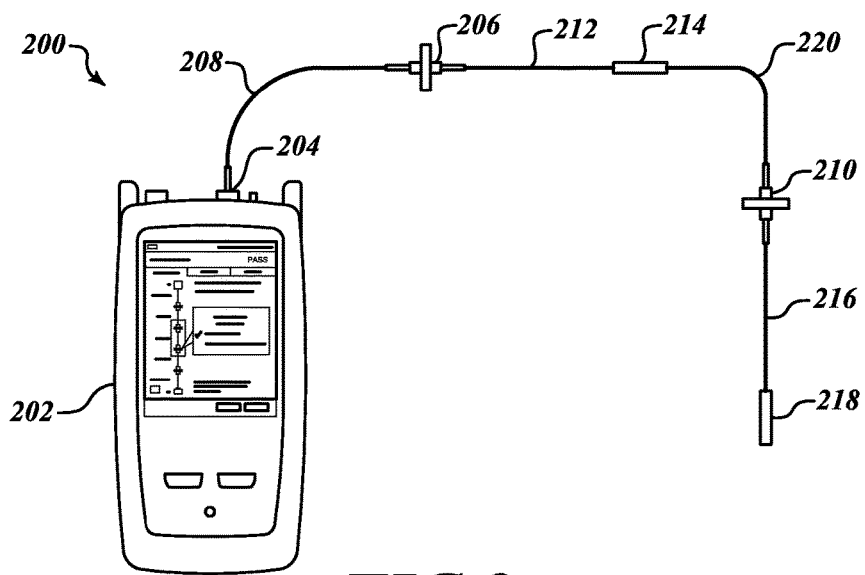
FIG. 2 illustrates another embodiment of a system usable for certifying physical parameters of fiber optic cabling.

FIG. 2 illustrates another embodiment of a system 200 usable for certifying physical parameters of fiber optic cabling. The system 200 includes a test device 202 that includes circuitry and programmed logic operable to perform operations such as measuring loss and length of a fiber optic link, calculating an allowable link loss according to a measured length and number of connections, and recording information to produce a certification test report in an automated manner. In FIG. 2, the test device 202 includes a port 204 to which a fiber optic cable 208 is coupled. In this embodiment, the fiber optic cable 208 is a launch reference cable or launch cord that couples the test device 202 to a fiber optic cable under test 212 via a connector 206.

The fiber optic cable under test 212 provides a link spanning between the connector 206 and a connector 210. At a first location along the fiber optic cable 212, a splice 214 couples adjacent segments of the fiber optic cable 212. At a second location 220, the fiber optic cable 212 is illustrated having a bend. Further coupled to the connector 210 is a fiber optic cable 216 comprising a receive reference cable or tail cord that terminates at a free end 218.

As with the first and second test devices 102, 122 shown in FIG. 1, the test device 202 shown in FIG. 2 includes circuitry and programmed logic that enables the test device 202 to conduct one or more certification tests of the fiber optic cable 212. In this instance, the tests performed by the test device 202 are considered "single ended" because the test device 202 is coupled only to one end of the fiber optic cable under test 212. To evaluate the test data obtained, the test device 202 may accesses information (e.g., stored in a database that is remote from or local to the test device 202) indicating the established parameters of one or more predetermined standards.

For purposes of illustrating the present disclosure, the test device 202 includes optical time domain reflectometer (OTDR) circuitry that is operable to inject light into the fiber optic cable 212 and receive light reflected from the fiber optic cable 212 during a certification test. The reflected light is indicative of interaction of the injected light with one or more physical aspects of the fiber optic cable 212.

Figure 3A:
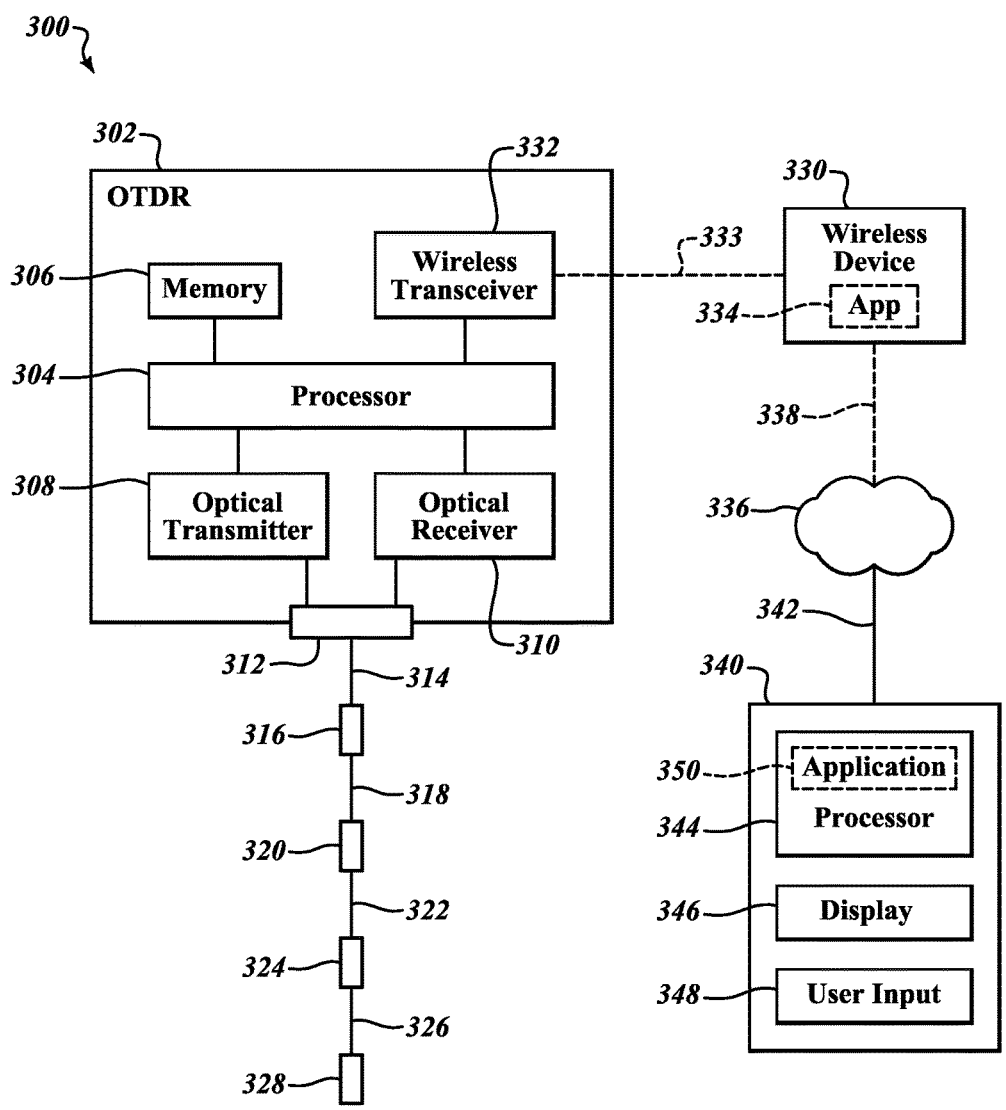
FIG. 3A is a block diagram illustrating another embodiment of a system usable for certifying physical parameters of a fiber optic cable.

FIG. 3A is a block diagram illustrating another embodiment of a system 300 usable for certifying physical parameters of a fiber optic cable. In this embodiment, the system 300 includes a test device 302 with OTDR circuitry and programming. More specifically, the test device 302 includes a processor 304 that controls the operation of the test device 302. The processor 304 is shown coupled to a non-transitory storage medium, such as a memory 306, that contains executable instructions. In response to execution, the instructions in the memory cause the processor 304 to carry out one or more certification tests. Aspects of the certification tests may also be controlled by signals received from other devices, as further described herein.

In accordance with at least one certification test, the processor 304 causes an optical transmitter (light source) 308 to generate and inject light into a fiber optic cable 314 via a port 312. The fiber optic cable 314 is a launch cord that delivers the injected light to a connector 316 that couples a fiber optic cable under test 318 to the launch cord. The injected light is transmitted through the fiber optic cable 318 and across a splice 320 that connects the fiber optic cable 318 to an adjacent optical fiber 322. The fiber optic cable 322 terminates at a connector 324 to which a fiber optic cable (tail cord) 326 is connected. The fiber optic cable 326 terminates with a connector 328 at a free end of the cable 326.

As light injected by the optical transmitter 308 into the launch cord 314 encounters features such as the connector 316, the splice 320, and the connector 324, a portion of the light may be reflected in a back scatter signal that is received by an optical receiver 310 in the test device 302. As mentioned earlier, the timing of such reflections received by the test device 302 may be used to calculate the approximate location of such features or "events" along the length of the optical fiber.

Figure 3B:
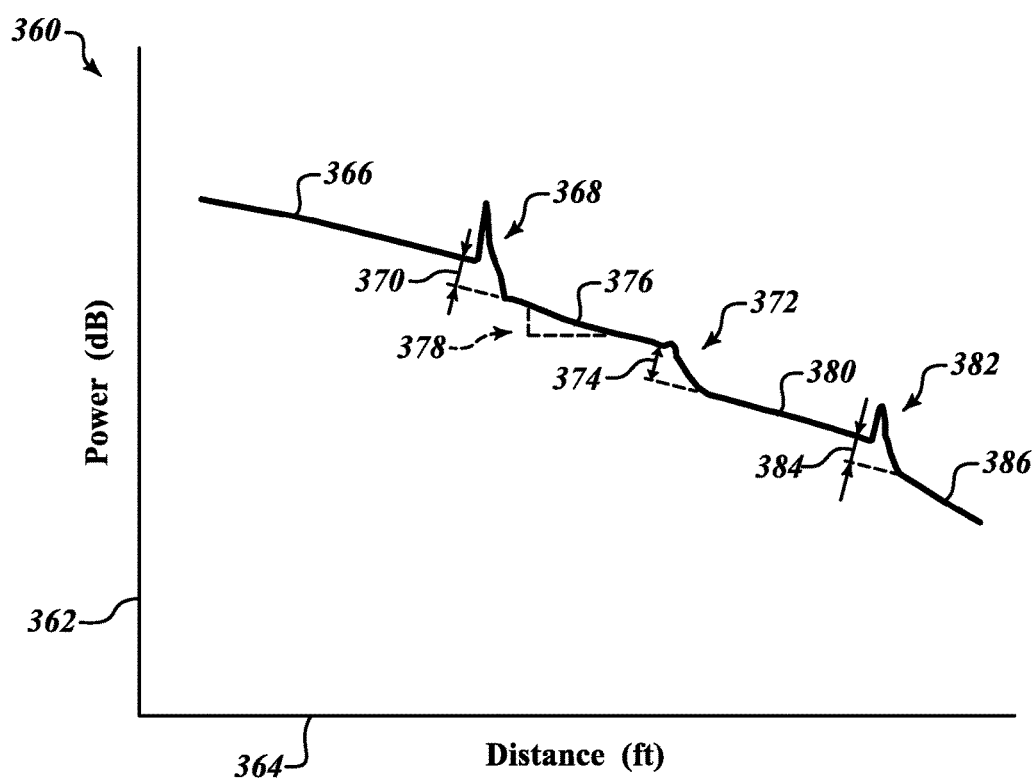
FIG. 3B illustrates a chart with a sample trace that plots a detected strength of a light signal transmitted through a fiber optic cable with respect to distance traversed by the light signal.

For instance, FIG. 3B illustrates a chart 360 with a sample trace that plots a detected strength of the light signal transmitted through the optical fiber with respect to distance traversed by the light signal. In this example, the vertical axis 362 represents signal power (dB) and the horizontal axis 364 represents the distance (ft). The signal power illustrated on the chart may be relative signal power rather than an absolute measured signal power.

Viewing FIGS. 3A and 3B together, as the light signal traverses the optical fiber, the connector 316 causes a first reflection 368 indicated by a small spike in the trace. Prior to the connector 316, the light signal has a higher (but decreasing) signal power 366 relative to the signal power 376 following the connector 316. The difference in the relative signal power, as illustrated by arrow 370, is indicative of the insertion loss caused by the connector 316.

At each stage along the trace, the slope of the depicted single power is indicative of the insertion loss caused by the particular segment of the optical fiber cable. In this example, the slope 378 illustrates the insertion loss of the fiber optic cable 318 shown in FIG. 3A.

The next reflection 372 in the trace is caused by the splice 320. The light reflected by a splice is much smaller than the light reflected by a connector. Nevertheless, the splice 320 produces a measurable insertion loss as indicated by arrow 374. The slope of the segment 380 of the trace illustrates the insertion loss of the fiber optic cable 322 shown in FIG. 3A.

Lastly, a reflection 382 depicted by a small spike in the trace shown in FIG. 3B is caused by the connector 324 shown in FIG. 3A. The connector 324 produces a measurable insertion loss as indicated by arrow 384. The end of the trace 386 results from the light signal traversing the receive reference cable or tail connector 326.

As discussed above, the OTDR circuitry in the test device 302 may automatically estimate physical parameters of the optical fiber such as the loss slope or "attenuation" of the fiber segments and the insertion loss of individual connectors and splices in the optical fiber under test.

Additionally, another physical parameter of a fiber optic cable that is detectable by OTDR circuitry is a fault in the physical media of the fiber optic cable. Such fault may be caused by imprecise manufacturing of the fiber optic cable, or may be induced by improper handling of the fiber optic cable. For instance, as illustrated in FIG. 2, the fiber optic cable under test 212 has a bend 220 in the cable. If the bend 220 is too severe, the bend may cause a reflection or backscatter of the light signal traversing the fiber optic cable, resulting in further loss of power in the transmitted light. Based on the reflection or backscatter of light received by the test device 202, the optical power loss caused by the bend 220, as well as the approximate location of the bend (or other fault) within the fiber optic cable, may be determined by the test device 202.

Returning to FIG. 3A, in accordance with various embodiments of the present disclosure, the system 300 may include at least one further device 330 that is operably couplable to the test device 302. In some embodiments, the device 330 is a wireless device, as illustrated in FIG. 3A. For instance, the wireless device 330 may be a mobile telephone. In other instances, the wireless device 330 may be a handheld computing device, such as a tablet computer or laptop computer, having functionality other than or in addition to mobile telephony.

As illustrated, the wireless device 330 is couplable to a wireless transceiver 332 in the test device 302 and communicates with the test device 302 via a communication link 333. Alternatively, the device 330 may be coupled to the test device 302 by a wired cable that provides the communication link 333. As desired, the communication link 333 may be implemented using any of a wide variety of wireless communication protocols, such as Bluetooth, Wi-Fi, infrared, ZigBee, or the like, or using a serial or parallel wired communication protocol.

Signals communicated between the wireless device 330 and the test device 302 may include one or more control signals that enable the wireless device 330 to control an operation of the certification test conducted by the test device 302. For instance, the wireless device 330 may communicate a control signal that initiates communication of an input light signal into a fiber optic cable and/or reception of an output light signal as part of a certification test of the fiber optic cable. Alternatively, or in addition, the signals communicated between the test device 302 and the wireless device 330 may include data indicative of one or more results of the certification test conducted by the test device 302.

As further illustrated in FIG. 3A, the wireless device 330 is also communicatively coupled to a computing device 340 that is remote from the test device 302. In the illustrated embodiment, the wireless device 330 is communicatively coupled to the remote computing device 340 by way of a wireless communication link 338 to a network cloud (e.g., a base station of a cellular network coupled to a wide-area network, such as the Internet), which in turn is coupled to the remote computing device 340 by a communication link 342.

As illustrated, the remote computing device 340 includes a processor 344, a display 346, and a user input 348 that facilitate operation of the remote computing device 340. While the remote computing device 340 is explicitly shown including the display 346 and user input 348, the wireless device 330 and/or the test device 302 may also include a display and user input, if desired, to facilitate operation of the respective wireless device 330 or test device 302. In at least one aspect, the display 346 is usable to provide one or more results of certification testing as reported from the test device 302 to the remote computing device 340 via the wireless device 330. Alternatively, or in addition, a display in the wireless device 330 may be used to provide one or more certification test results received from the test device 302. Likewise, a display in the test device 302 may directly provide one or more results of certification testing performed by the test device 302.

In some devices, a display may include a touch sensitive screen that can also act to receive user input. A touch sensitive screen allows a user to interact with the display and provide user input in an intuitive way. "Gesture-based" interface technology may enable features such as single-touch tap and swipe control for selecting and scrolling menu items, multi-touch pinch to zoom for easy magnification control on a graphical trace, and provide task-focused design to reduce back and forth navigation by a user through different screens.

Once the communication connection between the wireless device 330 and the remote computing device 340 is established, the wireless device 330 may communicate information to the remote computing device 340, such as data received from the test device 302 indicative of one or more results of the certification testing performed by the test device 302. Such data may be used by the remote computing device 340 to update a database element in the remote computing device 340 to indicate whether the fiber optic cable under test has satisfied a predetermined standard. In that regard, either prior to, during, or after the process of testing the fiber optic cable, the test device 302, the wireless device 330, and/or the remote computing device 340 accesses information indicating the parameters and parameter values of a predetermined standard, or a plurality of predetermined standards, e.g., by a call to a database that is remote or local to the test device 302) where the information is stored. The data obtained from testing the fiber optic cable is compared to the parameter values of the standard or standards to produce certification test results. In some embodiments, the communicated information may be more granular and report specific test results, including measurements or evaluations of data indicating whether one or more physical parameters of the fiber optic cable satisfy one or more corresponding parameters of a predetermined standard. It is contemplated that the measurements and/or evaluations or results of the certification testing may be stored in a historical data set so that the physical integrity of the fiber optic cable may be observed over time.

To facilitate communication between the wireless device 330 and the remote computing device 340, each of the wireless device 330 and the remote computing device 340 may have an application, or app, operable by a processor of the respective device that provides the necessary interface for communication of information between the respective devices. For instance, the wireless device 330 may operate an app 334 that collects results of a certification test received from the test device 302 and communicates the results using a web-based protocol to a corresponding application 350 operating in the processor 344 of the remote computing device 340.

Embodiments of the present disclosure contemplate testing physical parameters of a fiber optic cable and evaluating the measured physical parameters of the cable with regard to corresponding physical parameters of a predetermined standard. As mentioned earlier, various organizations have promulgated objective standards that are usable to characterize and evaluate the physical integrity of an installation of communication links, including fiber optic cabling. As will be described below, procedures for arranging a certification test as well as conducting the certification test and reporting the results may be configured by way of user interaction with one or more user inputs 348 in the remote computing device 340, the wireless device 330, or the test device 302.

Figure 4:
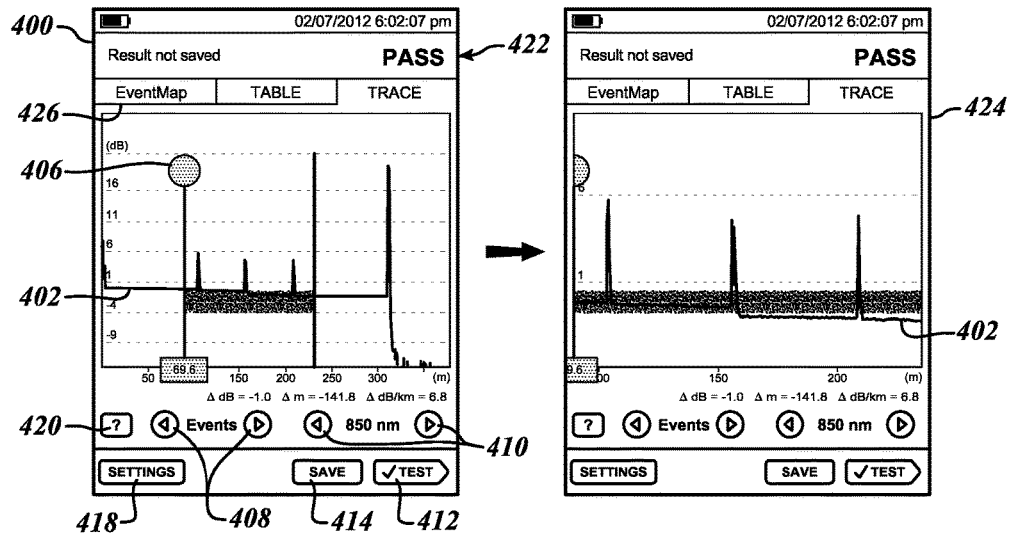
FIG. 4 is a pictorial diagram illustrating an example of a screen display including a trace from a certification test performed on a fiber optic cable.

FIG. 4 is a pictorial diagram illustrating one example of a screen display 400 that includes a trace 402 resulting from a certification test performed on a fiber optic cable. The display 400 may be shown on a test device, a separate wireless device, or a remote computing device as described herein depending on the circuitry and processing capabilities provided in the respective devices. The trace 402 depicts several detected events 404 along the length of the fiber optic cable under test. These events 404 are depicted in greater detail in the screen display 424, which depicts a zoomed-in portion of the trace 402. A cursor 406 is usable to denote areas of interest in the trace 402 as well as measure relative distances of events detected during the certification test.

As further illustrated in FIG. 4, the display 400 may include user interface elements that facilitate user interaction with the respective device. For example, the arrow buttons 408 may allow a user to step through various events 404 detected in the trace 402. The arrow buttons 410 may allow a user to step through certification tests conducted with different wavelengths of light. A TEST button 412 may allow a user to initiate a new certification test of the fiber optic cable, while a SAVE button 414 may allow the user to record a certification test, or one or more results thereof, in memory.

A SETTINGS button 418 may enable a user to configure the display 400 as well as control various aspects of the certification testing being performed. A question button 420 may provide context-sensitive help to the user. The screen display 400 also includes several tabs 426, including an "EventMap" tab, a "Table" tab, and a "Trace" tab in this example, the latter of which (i.e., the "Trace" tab) is presently selected for the display 400. Based on an evaluation of data produced by a certification test, various physical parameters of the fiber optic cable under test may be compared with corresponding parameters or limits of a predetermined standard, with the result of the comparison being displayed. For instance, the display 400 includes a "PASS" report 422 indicating that the fiber optic cable under test satisfied the standard that was predetermined for the certification test.

For proper certification testing of a fiber optic cable, such as the fiber optic cables 114 and 132 shown in FIG. 1 and/or the fiber optic cable 212 shown in FIG. 2, it is important that the launch cords 108, 126, and 208, and the receive (tail) cords 118, 136, and 216, are in good condition. Procedures to ensure that the launch and receive cords are in acceptable condition are described, for example, in TIA-568-C.0 Annex E. In this respect, a source and a meter are connected to a single launch or receive cord and an actual power reading (a dBm measurement, rather than dB) is obtained. The launch or receive cord is then detached from the meter. An adapter and a second launch or receive cord is added, connecting the assembly to the meter. In this example, it is expected that a power reading from the second configuration is within 0.75 dB of the first reading. The second launch or receive cord is unplugged and the ends are swapped. A power reading of this configuration should still be within 0.75 dB of the original reading. Greater assurance of consistency can be obtained by repeating the process after exchanging the positions of the two cords. Furthermore, greater consistency can also be obtained by reducing the allowed variance in power readings, e.g., to 0.5 dB when older-style SC connectors are used and 0.2 dB when smaller LC connectors are used.

Test devices that includes OTDR circuitry are more expensive than OLTS or LSPM test devices, but they typically offer additional benefits, including improved productivity (performing more tests in the same amount of time), more detailed test reports showing the conditions of each test, and easier bi-directional testing (though this is not required by TIA-568-C.0). In addition to measuring loss, OTDR test devices determine cable length in order to calculate the loss and evaluate the loss against a standard. Having the test device determine the cable length provides greater certainty since it is possible the fiber length may vary somewhat from a length determined from cable jacket markings. The certification test device may automatically compare loss measurements against the parameters of a predetermined standard and return a PASS or FAIL result.

It should be recognized that receiving a PASS result as illustrated in FIG. 4 (indicating, e.g., the estimated loss complies with a predetermined standard) may not necessarily confirm that all individual connectors are properly terminated and clean of impurities. For example, in a horizontal link that is 90 m long, tested at 850 nm wavelength light, and terminated with LCs, with 0.1 dB loss at one end and 1.3 dB loss at the other end due to a bad or dirty connector, a test device may return a PASS result (i.e., the total loss is 1.72 dB, which is less than the 1.82 dB limit specified by the predetermined standard), though the PASS result obscures the fact that the fiber optic link includes a bad connector. This problem may be exacerbated when testing multiple links end-to-end through cross-connections or inter-connections, a practice allowed by typical standards.

To avoid these problems, the OTDR testing may take into account the loss typically achieved with the connectors and the cable being installed—for example, 0.3 dB to 0.4 dB for SC connectors and 0.1 dB to 0.2 dB for LC connectors. The actual loss readings may be individually compared to these numbers for a more-detailed evaluation of the fiber optic link that does not rely only on a PASS result. Alternatively, the OTDR testing may be configured to assess the loss from individual connectors and splices to ensure that the connectors and splices individually are in satisfactory condition, as well as confirm that the fiber optic link as a whole satisfies the standard.

Figure 5:
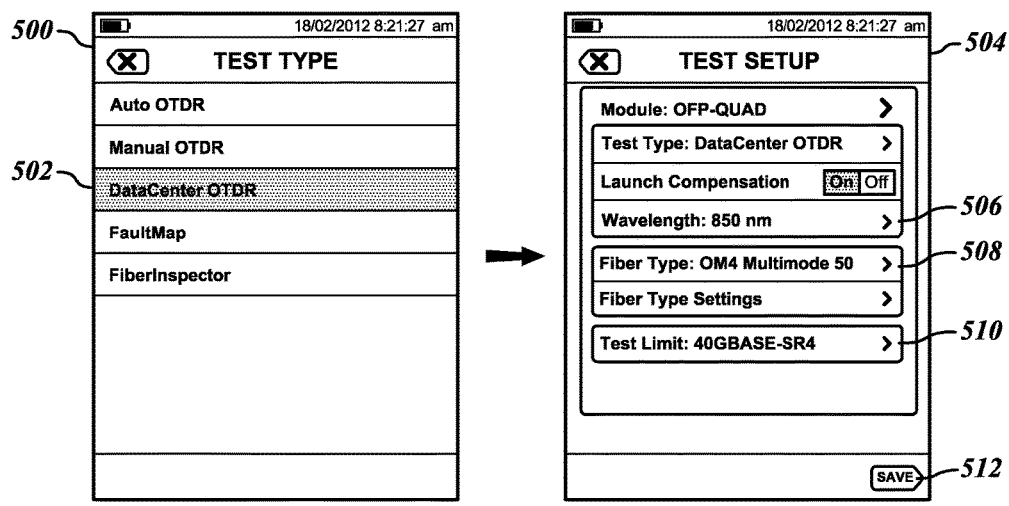
FIG. 5 is a pictorial diagram illustrating a screen display that allows a user to designate a test type for a certification test to be conducted.

FIG. 5 illustrates a screen display 500 that allows a user to designate a test type for the certification test to be conducted. In this particular example, the user may choose between auto OTDR testing, manual OTDR testing, data center OTDR testing, fault mapping, or fiber inspection. A selection of data center OTDR testing 502, for example, may result in a test setup screen display 504 that allows the user to further specify aspects of the certification test to be conducted. These aspects may include, for example, the wavelength of light 506 to be used in the test, the type of fiber 508 being tested, and test limits 510. Once the aspects of the test are selected and defined, the aspects of the test may be saved by selecting the SAVE button 512.

Driven by server virtualization and multi-gigabit links between servers, networks, and storage, a data center typically employs more patch cords and dense topology connectors, rendering carrier-class OTDRs with long dead zones less accurate. OTDR test devices that include specific data center OTDR testing may provide greater accuracy for problem resolution. In the example shown in FIG. 5, a user is able to make a one-touch selection to initiate a data center OTDR mode and avoid setup time required for fine tuning the test parameters as needed in older OTDR test devices. A data center OTDR mode as illustrated may automatically detect and set up OTDR parameters to address the short links and number of connectors that may be found in a data center.

An event mapping feature as indicated in FIG. 4 may be used to depict detected events in a graphical map that simplifies an evaluation of the certification test results without requiring specific trace analysis expertise. For example, as illustrated in the screen display 600 shown in FIG. 6, a certification test may produce a graphical map showing a first fiber segment 602 connected to a second fiber segment 604, which in turn is connected to a third fiber segment 606. Estimated lengths of the fiber segments are indicated on the display 600 adjacent to the respective fiber segments. The display 600 further shows the type of fiber being tested 608 and the test limits 610 as established, for example, in the test set up shown in FIG. 5.

In this example, the display 600 further illustrates user selection of an element 612 of the graphical map corresponding to a connection between the fiber optic cable under test 604 and the receive cable (tail cord) 606. Selection of the connector 612, in this instance, produces detailed test results 614, such as loss and reflectance, for the particular connector. The display 600 is further configured to report test results such as the length 616 of the fiber under test and the overall loss 618 in the fiber. With these measured physical parameters in hand, the test device is configured to compare the measured physical parameters against corresponding parameters in a predefined standard and certify whether the measured physical parameters satisfy the corresponding parameters in the standard. In this instance, a PASS result 620 is shown, indicating that the measured physical parameters satisfy the corresponding parameters in the standard.

Figure 7:
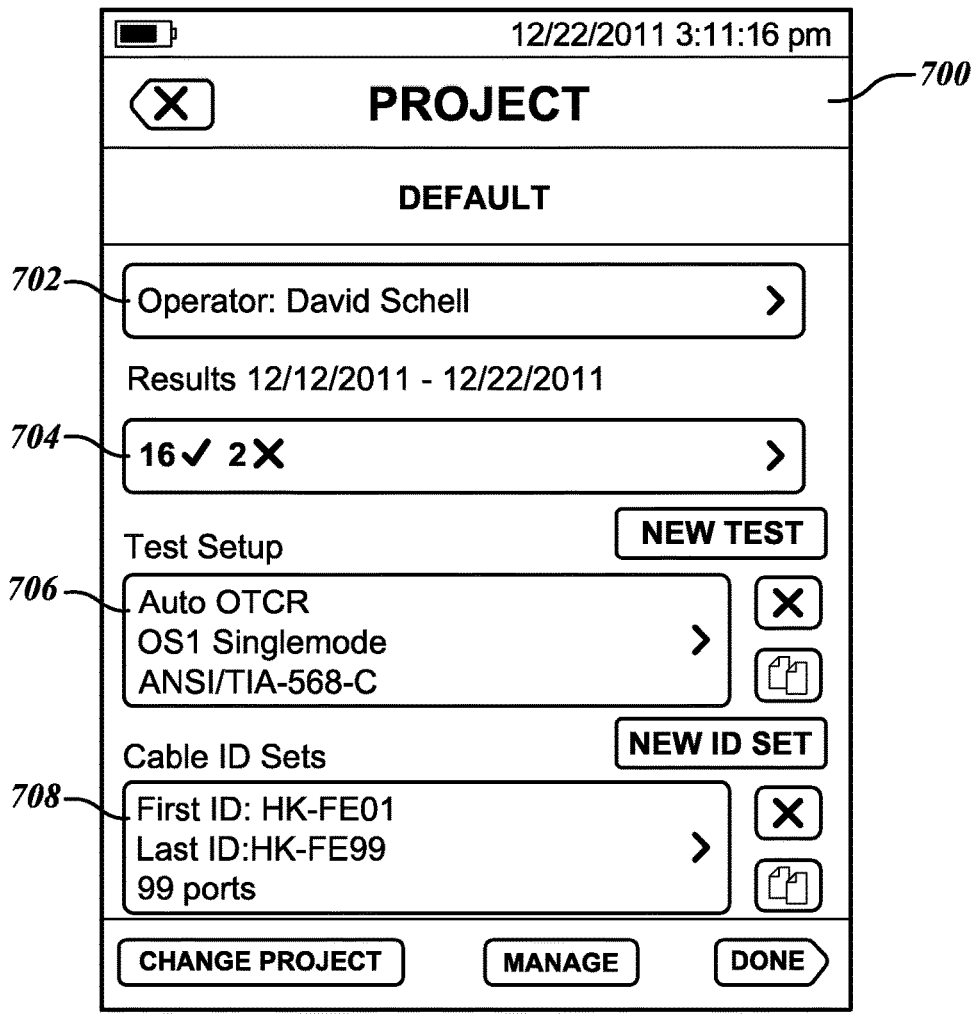
FIG. 7 is a pictorial diagram illustrating a screen display showing parameters of a defined project for certification testing.

A technician in the field may be requested to conduct a large number of certification tests of different fiber optic installations. To keep track of the different installations and the desired certification testing, one or more projects may be defined within the test device that the technician is using. For instance, FIG. 7 depicts a screen display 700 showing parameters of a defined project. An OTDR that includes built-in project management tools allows a project manager to define each user's role, as well as the settings (test type, location, predetermined standard, etc.) and associated tasks to be performed.

In addition to indicating the name of the technician (operator) 702 assigned to work on the project, the display 700 may indicate the outcome 704 of prior certification testing, details regarding the certification test 706, and identifiers of the fiber optic cable(s) being tested 708. Such aspects of the project may be defined directly on the test device using one or more user inputs of the test device, or the project may be defined remotely from the test device, e.g., by the remote computing device 340 shown in FIG. 3A. Defining a project beforehand enhances job efficiency by allowing a workflow planner to create and manage job profiles on a project-by-project basis, by defining jobs and sets of cable IDs and making assignments to specific technicians. The progress and status of each project in this manner can easily be monitored. Accordingly, the OTDR device is able to certify fiber performance based on the job assignments for each technician, facilitate device sharing with clear job assignments for each technician using the OTDR, provide up-to-date monitoring of job progress with PASS/FAIL results, and generate and upload data for reporting.

If desired, an application running on the test device 302, the wireless device 330, or the remote computing device 340 may be configured to display a dashboard providing information on the status and activity for each project to ensure that the projects are timely completed. By providing the ability to directly upload and consolidate test results from multiple test devices, projects can be quickly validated and test results evaluated in real time. This may help avoid future rework due to incorrect testing or missing test results. The applications may also be configured to generate professional reports in a common format.

As indicated in FIG. 5, a certification test device may be used to conduct a visual fiber inspection. When the physical parameters of a fiber optic cable fail to satisfy a predetermined standard, the failure sometimes arises from using contaminated connections. The failure may also result from failing to follow the connector manufacturer's recommended termination procedures, using damaged cable, and problems with the test devices and launch and receive cords themselves.

Figure 8:
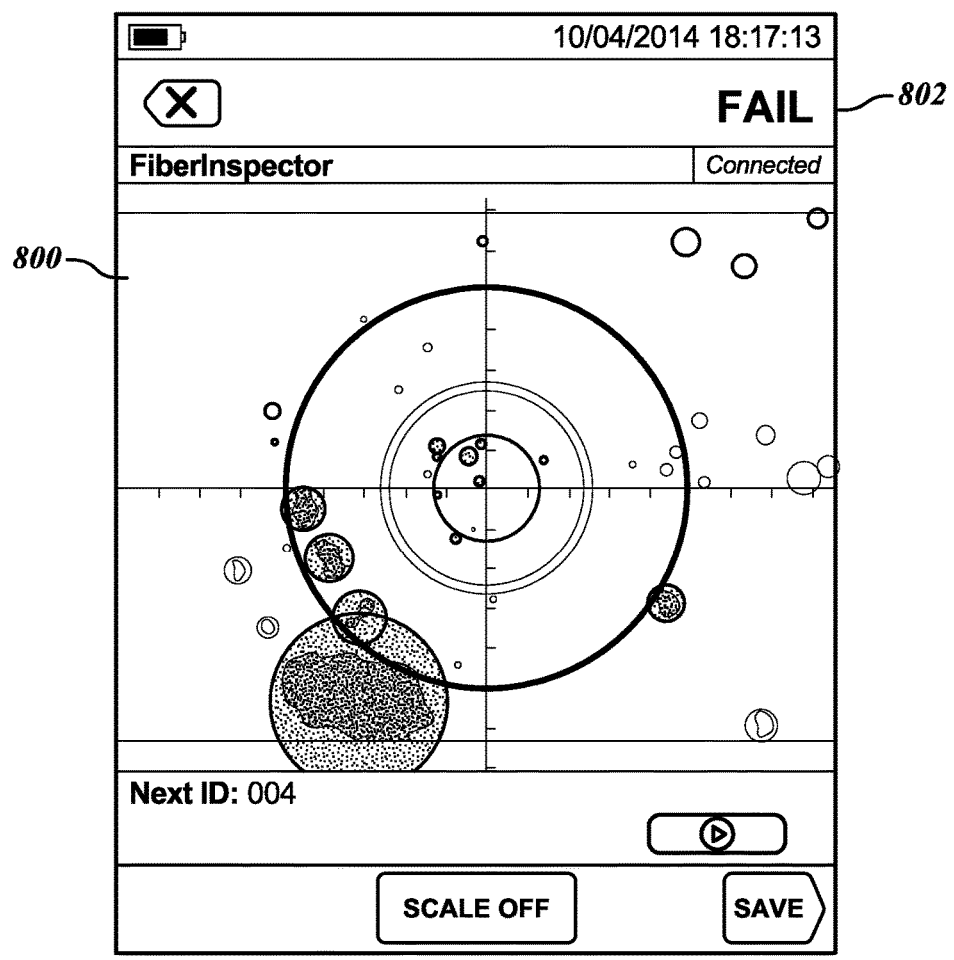
FIG. 8 is a pictorial diagram illustrating a screen display of a video inspection system that produces an automated certification in accordance with one or more predetermined standards.

A test device may be configured with a video inspection system that enables a user to quickly inspect and certify fiber end faces inside ports or at the ends of launch and receive cords. As illustrated by the screen display 800 in FIG. 8, one example of a video inspection system produces an automated PASS/FAIL certification 802 per one or more predetermined standards, such as IEC 61300-3-35. A video inspection test reduces or eliminates human subjectivity in the fiber inspection. Results of this certification test can be saved in a memory, transmitted to another device, and/or output in a certification report along with other certification test results.

If a test failure is due to a contaminated connection, a technician typically cleans the fiber connector by wiping the connector ferrule with a lint-free paper or fabric pad moistened with alcohol. The alcohol helps to dissolve contamination that may be present on the ferrule. After cleaning with alcohol, the technician may use a clean dry wipe and polish the ferrule dry. After cleaning, a dust cap should immediately be placed on the connector to prevent damage to the ferrule and help reduce recurrence of the contamination.

A microscope may also be used to check the physical integrity of connector end faces. A field-polished connector may have been poorly polished or damaged after termination. Pre-polished connectors, also known as factory-polished or no-polish connectors, can fail for having a bad cleave or an incompletely inserted fiber.

If the certification testing shows high loss and cleaning the connectors does not correct the problem, a test device with OTDR circuitry can be used to locate the problem. If the connectors appear clean and are properly terminated, the high loss may be due to a portion of the fiber optic cable that has been over-stressed, crushed, or bent too tightly during installation. See, e.g., the bend 220 in FIG. 2. If the damage is not too severe, a tight bend causing high loss in a cable may simply be straightened out. If the cable is damaged, for example by being crushed at a particular location, that section of the cable may need to be removed and the ends spliced together. Most predetermined standards allow for splicing of fiber optic cable as long as the measured end-to-end insertion loss is satisfactory. If the damage is too extensive, the cable must be replaced. For example, if an optical fiber is pulled excessively by the jacket, microbends can be created along the entire length of the cable (giving the cable a "wavy" appearance). Such microbends are not repairable.

Figure 6:
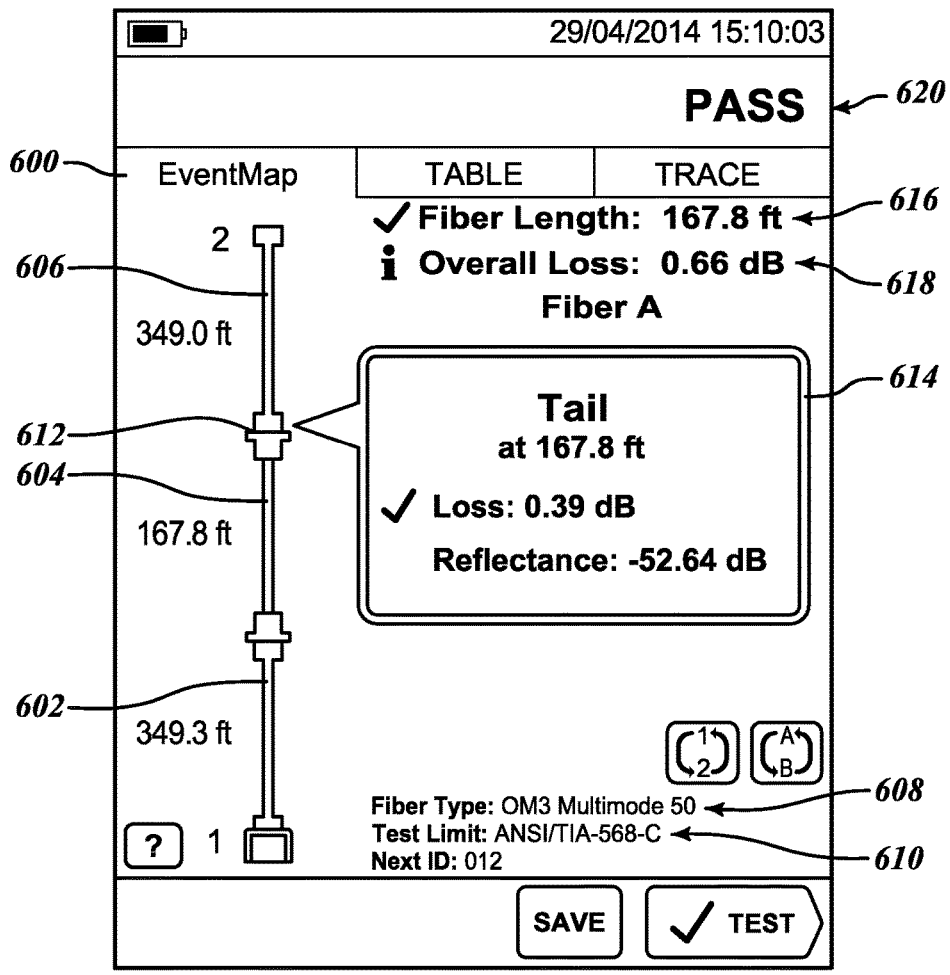
FIG. 6 is a pictorial diagram illustrating a screen display showing an event mapping feature that depicts detected events in a graphical map.
Figure 9:
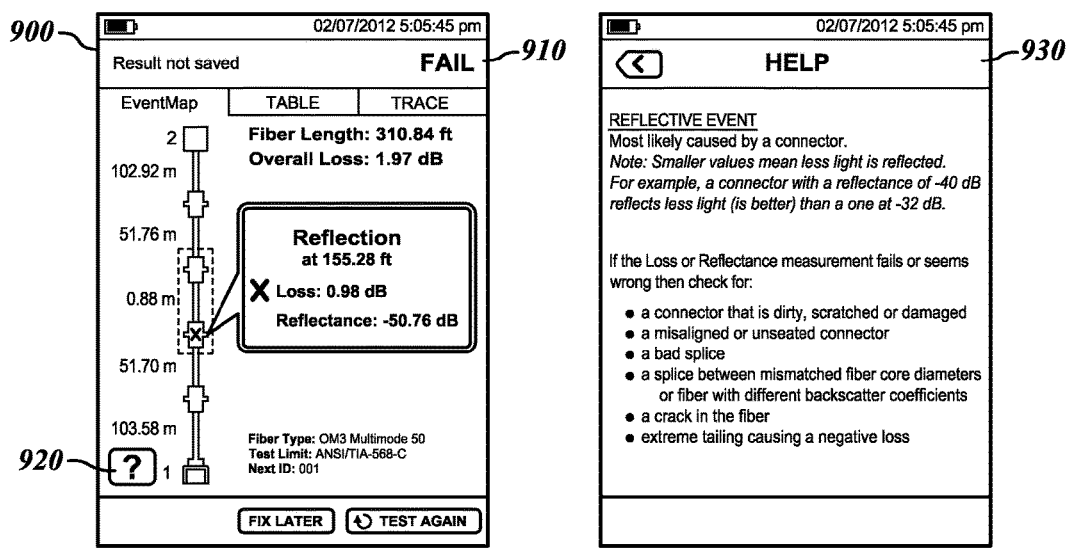
FIG. 9 is a pictorial diagram illustrating a screen display showing an event mapping feature with context-sensitive on-screen help information.

FIG. 9 depicts an event mapping screen display 900 similar to the screen display 600 shown in FIG. 6. In the display 900, however, the results of the certification test include a FAIL indicator 910 indicating that physical parameters of the fiber optic cable did not satisfy the corresponding parameters of the predetermined standard. As similarly noted with the button 420 in FIG. 4, the display 900 may include a button 920 that a user of the test device can select to obtain context-sensitive on-screen "help." In this instance, the on-screen help may suggest corrective action(s) 930 for resolving fiber problems that are identified during each testing step. Because the offered help is context sensitive, the user is able to quickly identify and implement possible resolutions to individual problems as they arise.

While the foregoing description discusses certification testing of fiber optic cables in particular, it should be understood that the present disclosure is also applicable to certification testing of other types of communication links, including wired and wireless communication links. For example, for certification testing of wireless communication links, the connectors 110, 116, 128, and 134 that are illustrated in FIG. 1 may be wireless transceivers and the communication links under test 114 and 132 may be air interfaces for wireless communication between the respective transceivers. In such an example, the launch and receive cords 108, 118, 126, and 136 may not be used and other links can connect the test devices 102 and 122 to the respective wireless transceivers. As with fiber optic cabling, various organizations have promulgated standards for evaluating the physical parameters of wired and wireless communication links. Aspects of such certification testing may be controlled by a separate device, such as the wireless device 330 and/or the remote computing device 340, described earlier herein. Likewise, a test device conducting such certification testing may communicate one or more results of a certification test to a separate device, such as the wireless device 330 and/or the remote computing device 340, described earlier herein.

The various embodiments described above can be combined to provide further embodiments. These and other changes can be made in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for certifying physical parameters of fiber optic cabling, the system comprising:
   a test device operably couplable to an end of a fiber optic cable, wherein the test device is operable to inject light into the fiber optic cable and conduct a certification test of physical parameters of the fiber optic cable, and wherein, based on observation of interaction of the injected light with the fiber optic cable, the test device is further operable to produce data representing one or more physical parameters of the fiber optic cable, evaluate the one or more physical parameters of the fiber optic cable by accessing information indicating established parameters of multiple predetermined standards that set forth objective requirements that the fiber optic cable must meet and comparing the data to the established parameters, and certify whether the one or more physical parameters satisfy one or more corresponding parameters specified by the multiple predetermined standards; and a wireless device operably couplable to the test device, wherein the wireless device is configured to wirelessly communicate a control signal to the test device for controlling an operation of the certification test, and wherein the wireless device is further operable to wirelessly receive a result of the certification test from the test device, wherein the result of the certification test received by the wireless device comprises data representing the one or more physical parameters of the fiber optic cable, and wherein the wireless device is further operable to evaluate the one or more physical parameters of the fiber optic cable with respect to corresponding parameters of multiple predetermined standards and certify the fiber optic cable for at least one predetermined standard of the multiple predetermined standards that is satisfied.

2. The system of claim 1, wherein the test device is a first test device and the end of the fiber optic cable is a first end of the fiber optic cable, the system further comprising a second test device operably couplable to a second end of the fiber optic cable, and wherein the wireless device is further operable to wirelessly receive a result of the certification test from the second test device.

3. The system of claim 2, wherein the second test device includes an optical power meter operable to receive output light from the second end of the fiber optic cable, and based on the received output light, generate a result of the certification test indicative of an insertion power loss of the fiber optic cable.

4. The system of claim 1, wherein the test device includes optical time domain reflectometer (OTDR) circuitry operable to receive reflected light from the fiber optic cable indicative of interaction of the injected light with one or more physical aspects of the fiber optic cable, wherein the OTDR circuitry is further operable to evaluate the reflected light and produce a result of the certification test based on the evaluation.

5. The system of claim 4, wherein at least one physical parameter of the fiber optic cable is a connector connecting at least one segment of the fiber optic cable with an adjacent optical fiber, and the OTDR circuitry is operable to produce data indicating an optical power loss as a result of the connector and an approximate location of the connector within the fiber optic cable.

6. The system of claim 4, wherein at least one physical parameter of the fiber optic cable is a splice in the fiber optic cable, and the OTDR circuitry is operable to produce data indicating an optical power loss as a result of the splice and an approximate location of the splice within the fiber optic cable.

7. The system of claim 4, wherein at least one physical parameter of the fiber optic cable is a length of the fiber optic cable, and the OTDR circuitry is operable to produce data indicating an approximate length of the fiber optic cable.

8. The system of claim 4, wherein at least one physical parameter of the fiber optic cable is a fault within the fiber optic cable, and the OTDR circuitry is operable to produce data indicating an optical power loss as a result of the fault and an approximate location of the fault within the fiber optic cable.

9. The system of claim 1, wherein the wireless device is further communicatively coupled to a remote computing device that is operable to receive the result of the certification test from the wireless device and update a database element with information indicating whether the one or more physical parameters of the fiber optic cable satisfy the one or more corresponding parameters of at least one predetermined standard of the multiple predetermined standards.

10. The system of claim 1, wherein the result of the certification test received by the wireless device comprises data representing the one or more physical parameters of the fiber optic cable, and wherein the wireless device is further operable to evaluate the one or more physical parameters of the fiber optic cable and certify whether the one or more physical parameters satisfy one or more corresponding parameters specified by a predetermined standard.

11. A system for certifying physical parameters of fiber optic cabling, the system comprising:
a first test device operable to inject an input light signal into a first end of a fiber optic cable as part of a certification test of the fiber optic cable;
a second test device operable to receive an output light signal from a second end of the fiber optic cable as part of the certification test of the fiber optic cable; and
a wireless device operably couplable to the first test device and/or the second test device, wherein the wireless device is operable to wirelessly communicate a control signal to the first and/or second test device for controlling an operation of the certification test, and wherein the wireless device is further operable to wirelessly receive a result of the certification test from the first and/or second test device, wherein the result is usable to certify whether one or more physical parameters of the fiber optic cable satisfy one or more corresponding parameters specified by a predetermined standard,
wherein said certification test includes accessing information indicating established parameters of the predetermined standard that sets forth objective requirements that the fiber optic cable must meet and comparing the received data or data derived therefrom to the established parameters, and
wherein the result of the certification test received by the wireless device comprises data representing the one or more physical parameters of the fiber optic cable, and
wherein the wireless device is further operable to receive an input indicative of corresponding parameters specified by multiple predetermined standards and compare the received data with the corresponding parameters to determine which of the multiple predetermined standards is satisfied by the fiber optic cable and to certify the fiber optic cable for at least one predetermined standard of the multiple predetermined standards that is satisfied.

12. The system of claim 11, wherein the result of the certification test received by the wireless device comprises data representing the one or more physical parameters of the fiber optic cable, and wherein the wireless device is further operable to receive an input indicative of the one or more corresponding parameters specified by the predetermined standard and compare the received data with the corresponding parameters to certify whether the fiber optic cable satisfies the predetermined standard.

13. The system of claim 11, wherein the control signal initiates communication of the input light signal and reception of the output light signal by the first and send test devices, respectively.

14. The system of claim 11, wherein the first test device comprises a light source and the second test device comprises an optical power meter operable to generate data indicative of an insertion power loss of the fiber optic cable based on the received output light signal.

15. A system for certifying physical parameters of fiber optic cabling, the system comprising:
 a test device operably couplable to an end of a fiber optic cable to inject light into the fiber optic cable;
 a handheld computing device operable to communicate with the test device as part of a certification test of the fiber optic cable and receive, from the test device, data based on observation of interaction of the injected light with the fiber optic cable; and
 a remote computing device operable to communicate with the handheld computing device and coordinate, with the handheld computing device, processing of the data received by the handheld computing device and certification of whether one or more physical parameters of the fiber optic cable satisfy one or more corresponding parameters specified by multiple predetermined standards, wherein said certification includes:
  accessing information indicating established parameters of the multiple predetermined standards that set forth objective requirements that the fiber optic cable must meet;
  comparing the received data or data derived therefrom to the established parameters;
  determining which of the multiple predetermined standards is satisfied by the fiber optic cable; and
  certifying the fiber optic cable for at least one predetermined standard of the multiple predetermined standards that is satisfied.

16. The system of claim 15, wherein the handheld computing device is a mobile telephone comprising communication circuitry configured to wirelessly communicate with the test device and the remote computing device.

17. The system of claim 16, wherein the mobile telephone is operable to process the data received from the test device and certify the fiber optic cable for at least one predetermined standard of the multiple predetermined standards that is satisfied.

18. The system of claim 17, wherein the remote computing device is operable to communicate data indicative of the one or more corresponding parameters of the multiple predetermined standards to the mobile telephone.

19. The system of claim 15, wherein the test device comprises optical time domain reflectometer (OTDR) circuitry operable to receive reflected light from the fiber optic cable indicative of interaction of the injected light with one or more physical aspects of the fiber optic cable, and wherein the OTDR circuitry is operable to evaluate the reflected light and produce a result of the certification test based on the evaluation.

20. The system of claim 19, wherein at least one of the one or more physical aspects of the fiber optic cable includes a connector, a splice, or a fault in the fiber optic cable, and the OTDR circuitry is operable to produce data indicating an optical power loss as a result of the connector, splice, or fault, and an approximate location of the connector, splice, or fault within the fiber optic cable.

21. The system of claim 15, wherein at least one of the one or more physical parameters of the fiber optic cable is a channel capacity of the fiber optic cable.

22. A method for certifying physical parameters of fiber optic cabling, the method comprising:
 coupling a light source to an end of a fiber optic cable and communicating light into the fiber optic cable;
 receiving light from the fiber optic cable based on the light injected into the fiber optic cable, and generating data, based on the received light, that is indicative of interaction of the injected light with one or more physical aspects of the fiber optic cable and represents one or more physical parameters of the fiber optic cable;
 processing the generated data in a computing device to evaluate the one or more physical parameters of the fiber optic cable by accessing information indicating established parameters of multiple predetermined standards that set forth objective requirements that the fiber optic cable must meet and comparing the data to the established parameters, and automatically determine whether the one or more physical parameters satisfy one or more corresponding parameters specified by the multiple predetermined standards; and
 based on the determination, automatically communicating a certification to an output that indicates at least one standard of the multiple predetermined standards that the fiber optic cable satisfies.

* * * * *